March 6, 1962 G. I. HINCKLEY 3,023,487
METHOD FOR PRODUCING ROLLER ASSEMBLIES
Filed Dec. 9, 1959
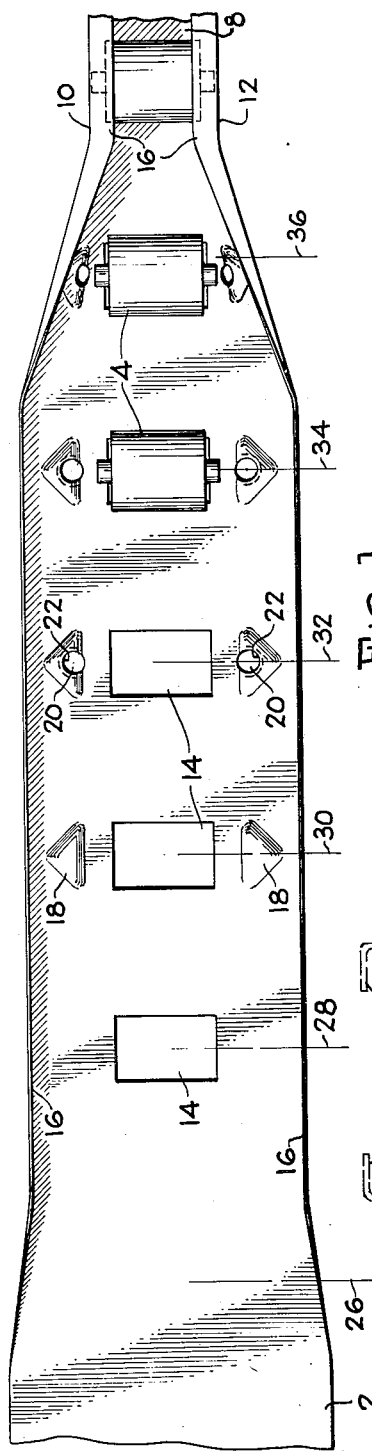
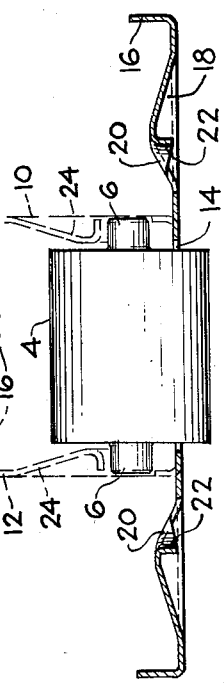
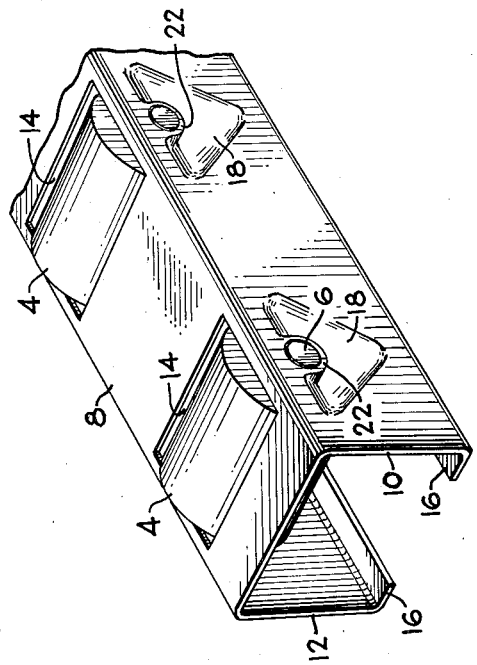
GARDNER I. HINCKLEY
INVENTOR.
BY Albert Sperry
ATTORNEY United States Patent Office 3,023,487
Patented Mar. 6, 1962

3,023,487
METHOD FOR PRODUCING ROLLER ASSEMBLIES
Gardner I. Hinckley, Pompton Plains, N.J., assignor to The Grand Union Company, East Paterson, N.J., a corporation of Delaware
Filed Dec. 9, 1959, Ser. No. 858,529
2 Claims. (Cl. 29—148.4)

This invention relates to methods of producing roller assemblies of the type employed in gravity-fed equipment such as that disclosed in co-pending application Ser. No. 825,916, filed on July 9, 1959, now issued as Patent No. 2,982,387 dated May 2, 1961.

Roller assemblies which embody a strip of material having a plurality of spaced rollers carried thereby have been produced in various ways but generally have required expensive and time-consuming operations which increase the cost of the assembly. In accordance with the present invention, these objections are overcome and methods provided whereby the supporting strip of material may be formed and the rollers assembled therewith in a simple and continuous manner which speeds up the operations and reduces the manufacturing cost.

These advantages are preferably attained by passing a strip of material through forming and punching equipment to produce a channel having both roller receiving openings and bearing surfaces for the roller trunnions. Rollers are positioned in the openings and the sides of the channel are pressed inward to receive the trunnions and hold the rollers in place. These steps may be carried out in a continuous operation to produce roller assemblies of any desired length required for a particular use or long strips of the assembly may be produced and severed to required lengths.

Accordingly, the principal object of the present invention is to provide novel and economical methods of producing roller assemblies.

A particular object of the invention is to produce roller assemblies in a continuous operation.

These and other objects and features of the present invention will appear from the following description thereof wherein reference is made to the figures of the accompanying drawings.

In the drawings:

FIG. 1 is a diagrammatic illustration of a strip of material upon which operations are performed in accordance with the present invention, FIG. 2 is a sectional view through a preferred form of roller assembly produced in accordance with the present invention, and FIG. 3 is a perspective illustrating a portion of the finished roller assembly of FIG. 2.

In that embodiment of the invention chosen for purposes of illustration in the drawing, the roller assembly is formed from a strip of material 2 such as sheet steel, brass or other metal although the strip may be made of suitable thermoplastic or thermosetting resin if desired. The rollers 4 of the assembly are preformed of suitable material such as nylon or the like and preferably have trunnions or axles 6 formed integral therewith.

The strip 2 is formed during the operation to provide a channelled cross section presenting a base 8 and side walls 10 and 12. The base is formed with roller receiving openings 14 which are of greater length than the body portion of the rollers 4 but of less width than the diameter of the rollers. The openings 14 are spaced apart lengthwise of the strip at equal predetermined distances corresponding to the desired spacing of the rollers in the finished assembly.

The side walls 10 and 12 of the channelled strip are preferably formed with marginal inturned attaching and strengthening flanges 16 and are provided with inwardly extending depressions 18 at opposite sides of each roller receiving opening 14. Within the depressions 18 trunnion receiving openings 20 are formed on the center lines of the roller receiving openings 14. The outer or lower side of each of the trunnion receiving openings 20 is flanged or turned from the depression to provide a bearing surface 22 engageable by the trunnions 6 of the rollers 4. The bearing surfaces 22 preferably extend outwardly within the depressions 18 whereby the trunnions 6 may be made relatively short and the surfaces 24 of the depressions below the rollers are inclined inwardly in the finished assembly in a manner to afford increased strength and resistance to spreading of the channel when the rollers are subjected to heavy loading.

In forming such an assembly in accordance to the present invention, the strip 2 is advanced from left to right as seen in FIG. 1. The marginal edges of the strip are turned upward at station 26 to form the flanges 16 of the finished channel. Thereafter, the roller receiving openings 14 are stamped out of the strip as it moves through station 28 and depressions 18 are formed as raised areas in the strip at opposite sides of the openings 14 as the strip passes through station 30. As the strip moves onward to station 32, the trunnion receiving openings 20 with their outwardly turned bearing surfaces 22 are formed within the raised areas which form depressions 18 in the finished roller assembly. The rollers are then deposited in each of the roller receiving openings 14 as the strip passes through station 34. Thereafter, the side walls 10 and 12 of the channel are folded upward as the strip and rollers move through station 36. During the latter operation, the trunnions 6 of the rollers are caused to enter the openings 20 in the depressions 18 of the side walls 10 and 12. The openings 20 are made larger than the trunnions 6 so that the trunnions enter the openings 20 very readily and the bearing surfaces 22 are positioned above the trunnions. In fact, the bearing surfaces 22 aid in positioning and centering the rollers 4 with respect to the openings 14 as the side walls are folded upward and inward.

When the assembly has been formed in this manner, it is cut into the desired lengths and is inverted to the position of FIG. 3 for use. The rollers then tend to fall away from the openings 14 in the base 8 of the channel so that they are spaced away from the sides of the openings and will not rub against the edges of the openings in use. At the same time, the bearing surfaces 22 support the rollers with the upper portions thereof projecting above the surface of the base 8 of the channel in a position to receive and support a load movable by gravity along the assembly. The anti-friction surface thus presented assures ready movement of articles along the assembly with a minimum of resistance.

While the various steps required in the fabrication of the assembly have been described as being carried out at separate stations, it will be apparent that two or more such operations can be performed simultaneously. Thus, for example, the punching of the roller receiving openings 14 and the formation of depressions 18 and trunnion-receiving opening 20 can all be effected at the same time by the use of suitable dies. On the other hand, the steps of punching the trunnion-receiving openings 20 and forming the bearing surfaces 22 can be carried out as separate operations if desired. It is also possible to change the order or succession in which the steps of the process are conducted. Moreover, movement of the strip 2 from the position to another can be effected in a continuous operation or step by step depending upon the type and manner of operation of the forming equipment and dies employed in carrying out the process.

These and other modifications and changes may be made in the operations employed in the practice of the present invention. In view thereof, it should be understood that the particular embodiment of the invention described above and shown in the drawing is intended to be illustrative only and is not intended to limit the scope of the invention.

I claim:

1. The method of producing a roller assembly which comprises the steps of forming roller receiving openings in longitudinally spaced relation centrally with respect to a strip of material, forming raised areas in side portions of the strip in alignment with the roller receiving openings and on opposite sides thereof, forming trunnion receiving openings in said raised areas placing rollers which have axially positioned trunnions thereon and are of larger diameter but less length than the roller receiving openings in said roller receiving openings, and thereafter bending the side portions of said strip upward into positions wherein the trunnions on the rollers enter the trunnion receiving openings and said raised areas project inward toward said rollers on opposite sides thereof adjacent the trunnion receiving openings.

2. The method of producing a roller assembly which comprises the steps of forming roller receiving openings in longitudinally spaced relation centrally with respect to a strip of material, forming raised areas in side portions of the strip in alignment with the roller receiving openings and on opposite sides thereof, forming trunnion receiving openings in said raised areas with the outer sides of the trunnion receiving openings projecting downwardly within the raised areas, placing rollers which have axially positioned trunnions thereon and are of larger diameter but less length than the roller receiving openings in said roller receiving openings, thereafter bending the side portions of said strip upward into positions wherein the trunnions on the rollers enter the trunnion receiving openings said raised areas project inward toward said rollers on opposite sides thereof adjacent the trunnion receiving openings, and inverting the assembly to cause the trunnions on the rollers to bear against the projections at the sides of the trunnion receiving openings and serve to hold the rollers spaced from the edges of the roller receiving openings.

References Cited in the file of this patent

UNITED STATES PATENTS

| | | |
|---|---|---|
| 1,447,386 | Haseltine | Mar. 6, 1923 |
| 1,499,126 | Severn | June 24, 1924 |
| 1,584,040 | Severn | May 11, 1926 |
| 1,961,794 | Severn | June 5, 1934 |
| 2,751,664 | Arnit | June 26, 1956 |